Jan. 3, 1950 J. R. CARR 2,492,965
LANDING SKI
Filed April 2, 1948
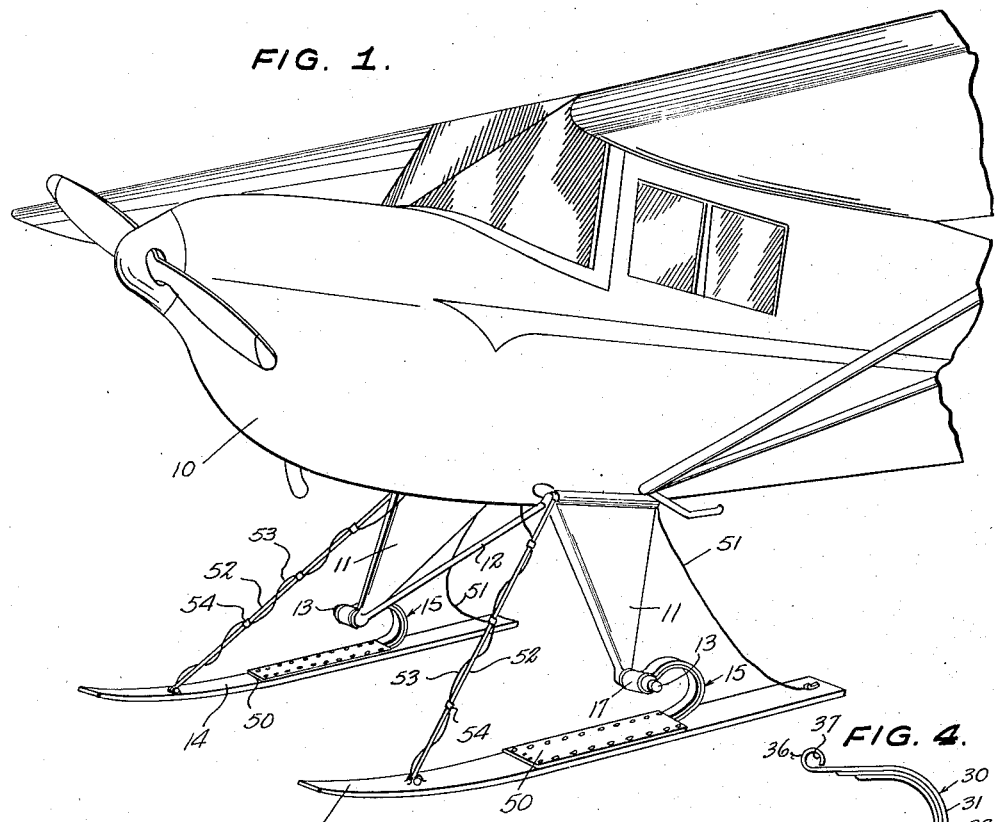
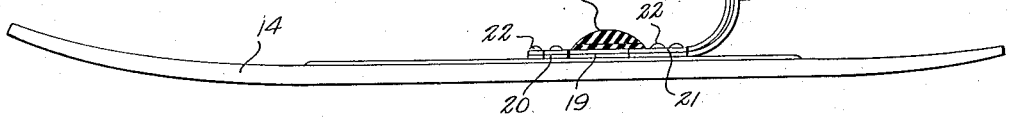
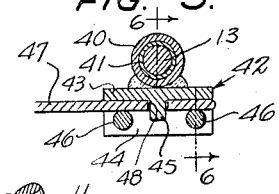
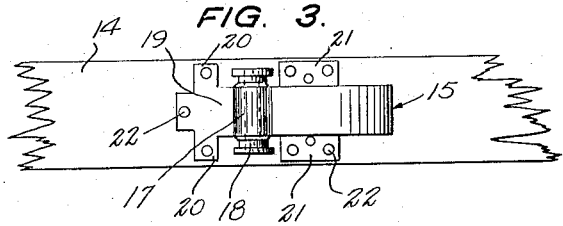
INVENTOR.
JESSE R. CARR,
BY
McMorrow, Berman & Davidson
ATTORNEYS.

Patented Jan. 3, 1950

2,492,965

UNITED STATES PATENT OFFICE 2,492,965

LANDING SKI

Jesse R. Carr, Anchorage, Territory of Alaska

Application April 2, 1948, Serial No. 18,671

9 Claims. (Cl. 244—108)

1

My invention relates to means for mounting landing skis for aircraft on such aircraft whereby to provide substitutes for landing wheels, and permit landing of the plane on ice or snow. Such ice or snow is rarely completely level and usual ski mounts are substantially rigid, whereby the plane and/or the landing gear of the same are subjected to severe landing shocks, for the most part when landing on snow and ice which is not substantially smooth.

I am aware that attempts have been made to provide resilient mounts for landing skis for aircraft, but such on the whole are not adapted for readily replacing the usual landing wheels when adapting the plane for use on ice or snow. Obviously, the severe shocks mentioned previously are damaging to the landing gear of the aircraft and/or the body thereof. Moreover, such shocks, if severe enough and not properly absorbed, may result in breakage of the landing gear, with the resultant wrecking of the plane. Moreover, although prior art devices have included springs or shock absorbers, they do not provide means which accomplishes a result equivalent to that of the usual landing wheel and tire.

With the foregoing in view, it is an object of my invention to provide improved means for mounting landing skis on aircraft.

A further object of my invention is to provide improved resilient mounts for landing skis for aircraft which are readily attachable to the aircraft in place of the usual landing wheels.

A further object of the invention is to provide an improved ski mount such as that last described which is adapted to be pivotally connected to the axles for the landing wheels of the plane after the landing wheels are removed.

A further object of the invention is to provide an improved resilient mount for landing skis for aircraft which are readily attachable to the aircraft in place of the usual landing wheels, and which includes spring means interposed between the axle for the landing wheel and the ski which permits vertical springing of the ski, resilient lateral movement of the ski relative to the axle, and lateral twisting movement of the ski relative to the axle.

A further object is to provide an improved resilient ski mount such as that last described and wherein the ski is permitted a limited twisting movement on a vertical axis relative to the axle.

Other objects and advantages reside in the particular structure of the invention, combina-

2 tion and arrangement of the several parts thereof, the structure of the several elements comprising the invention, and will be readily understood by those skilled in the art upon reference to the attached drawing in connection with the following specification, wherein the invention is shown, described and claimed.

In the drawing:

Figure 1 is a fragmentary perspective view of an airplane showing the device of the invention applied thereto.

Figure 2 is an elevation of one of the skis apart from the plane, and including a slight modification.

Figure 3 is a plan view of the mounting means according to Figure 1, with a portion of a protective covering or sheet removed.

Figure 4 is a fragmentary elevation like Figure 2, showing a modified form of mount.

Figure 5 is a transverse vertical section taken substantially on the plane of the line 5—5 of Figure 6 and showing a modification.

Figure 6 is a longitudinal vertical section taken substantially on the planes of the line 6—6 of Figure 5.

Referring specifically to the drawing, wherein like reference characters have been used throughout the several views to designate like parts, and referring specifically to Figure 1 for the moment, 10 designates any suitable aircraft such as a light airplane, which includes fixed landing gear 11 depending from the fuselage thereof. Such landing gear 11 is braced by any suitable cross-struts 12, and the lower end of such gear is provided with a fixed and laterally outwardly directed stub axle 13, which normally has a landing wheel, not shown, journaled thereon. As so far described, the structure is conventional and forms no part of my invention.

Referring specifically to Figures 1, 2 and 3, when it is desired to attach a pair of skis 14 to the plane in place of the usual landing wheels, I have provided a pair of substantially C-shaped springs 15 which may comprise a pair of leaf providing portions 16, integrally connected together at the upper end and there formed to provide a laterally directed cylindrical socket 17. The socket 17 is adapted to receive therein a bushing 18, which is formed to have a pivotal fit on the stub axle 13 of the landing gear. The bushing and upper end of the spring are secured on such stub axle in any suitable manner, as by the usual lock nut and washer used for securing the landing wheel thereon. As best seen in Figure 3, the lower end 19 of the spring is slightly narrower than the ski 14, but is provided with one or more pairs of laterally oppositely directed extensions 20 and 21, which are substantially coextensive in width with the ski 14 whereby to resist relative twisting movement between the ski and spring when the plane lands, or while it is travelling over rough terrain. The lower end of the spring is adapted to be rigidly and detachably secured to the ski 14 in any suitable manner, as by machine screws or bolts 22. As seen in Figure 2, it is sometimes desirable to provide a body of resilient material such as rubber or the like 23 across the upper surface of the lower end 19 of the spring, which is adapted to abut the upper end 17 of the spring upon compression of the spring and provide a shock absorber.

In the modification of Figure 4, a spring 30 is formed of a plurality of leaves 31, 32 and 33. Such leaves are formed with lateral extensions 34 at the lower ends whereby to provide a mount substantially coextensive in width with the ski 14, as in the first described form of the invention and for the same purpose. Moreover, all of the lower ends of the leaves are rigidly connected to the ski 14 by any suitable detachable fastening members 35. However, the leaves 31, 32 and 33 are of varying lengths, with the outermost leaf 31 being the longest and having its upper end formed to provide a loop 36, which provides a laterally directed cylindrical journal adapted to be pivotally received upon the stub axle 13 of the landing gear. As in the first described form of the invention, the spring 30 is secured on the axle 13 by the usual means utilized for securing the landing wheel.

In the modification shown in Figures 5 and 6, a journal 40 is provided with an internal bushing 41, which is pivotally receivable on the axle 13 of the landing gear and secured thereto by the usual lock nut 49. The journal 40 is secured in any suitable manner, as by welding, to the outer surface of the web 43 of a bracket 42. The bracket 42 is of channel configuration and includes the horizontally disposed web 43 and a pair of laterally spaced depending side flanges 44. A lug 45 integral with the web 43 depends therefrom between the flanges 44. The flanges 44 are provided with opposed pairs of longitudinally spaced apertures in which are detachably secured cross members 46 which may comprise bolts. As clearly seen in Figures 5 and 6, such bolts are in downwardly spaced relation to the under surface of the web 43 of the bracket. A suitable spring of similar configuration to those already described, and including at least one leaf 47 is insertable in the bracket between the side flanges 44 thereof. The spring 47 is provided with a socket or recess 48 which is adapted to receive the lug 45 therein to lock the spring against displacement from the bracket. After the spring has been seated on the lug 45, the cross pieces or members 46 are inserted across below the spring 47 whereby to prevent displacement of the same. With this structure a broken spring is readily replaced without removing the lock nut 49 from the stub shaft 13 of the landing gear, and it is contemplated that the spring 47 may approximate either of the previously described forms of springs or may comprise a single heavy duty leaf.

In all forms of the invention, it is contemplated that a flexible sheath 50 may be detachably secured to the skis 14 so as to overlie the lower ends of the springs and protect the portions and fastening means from the action of snow or ice.

In view of the fact that the skis 14 are pivotally mounted on the stub axle 13, I have provided means for limiting pivotal movement of the skis in both directions. An example of such means is illustrated and may comprise a check cable 51 of flexible inelastic material which is secured to the rear end of the skis 14, and also to the fuselage of the airplane whereby to limit pivotal movement of the skis in one direction. There is likewise provided a rather heavier shock cord 52, which secures the forward ends of the skis 14 to the fuselage of the plane. However, the shock cords 52 are formed of elastic material whereby they are stretchable to resist pivotal movement of the skis in one direction while yet permitting a certain amount of such movement. To limit the stretching movement of the shock cords 52, there is provided safety cables 53 which are twined around the shock cords 52 and secured thereto as at 54, whereby to permit limited extension of such shock cords. In this connection, it should be noted that the safety cables 53 are flexible inelastic material whereby such cables and the members 51 provide limit stops, limiting pivotal movement of the skis 14 in both directions on the stub axles 13. The shock cords 52 are particularly applicable when the plane is taxying over rough terrain whereby the passage of a ski over a hummock will frequently tend to depress the front end of the skis as the hummock passes the rear end of the skis. The shock cords 52 resist such depression of the front ends of the skis, while the safety cables 53 provide a safe limit of such movement whereby to prevent the front ends of the skis from digging into the soft snow or the like and causing the plane to perform a ground loop.

As is noted, the springs 15, 30 and 47 are preferably of C-shape with the upper ends and the lower ends forwardly directed. This particular structure, I have found, approximates the resiliency inherent in the usual landing wheel, and this structure, together with the limit means 51, 52 and 53 permits an action when taxying over rough terrain which is substantially similar to the effect achieved with landing wheels. Specifically, by interposing a spring such as those described hereinabove between the axles 13 and the skis 14, the effect lost in most ski mounts by replacing the resilient tire of the wheel with a ski is recaptured. Thus, the springs provide for a vertical springing of the aircraft 10 relative to the skis. Moreover, such springing action approximates a knee action, whereby each ski is independently sprung. Moreover, the particular springs disclosed permit individual lateral twisting along the long axis of each ski, whereby each ski is individually conformable to a sloping surface without breakage. Likewise, when the forward ends of the skis strike an object which is obliquely disposed relative to the path of travel of the skis, the particular springs disclosed permit a slight twisting of the ski as a whole on an axis verticle to that of the axle spindles 13. It is apparent, therefore, that the particular resilient action of the springs disclosed is multi-directional, whereby the ski is yieldable in every direction to absorb shocks received from every direction in much the same manner as a balloon tire of a landing wheel will absorb like shocks.

While I have shown and described what is now thought to be a preferred embodiment of the invention, it is to be understood that the same is susceptible of other forms and expressions. Consequently, I do not limit myself to the precise structure shown and described except as hereinafter claimed.

I claim:

1. Means for mounting landing skis on the axle for an aircraft landing wheel after removal of said wheel, comprising a substantially C-shaped spring having upper and lower ends, a journal pivotally receiving said axle, a bracket fixed to said journal and depending therefrom, means fixedly connecting said upper end of said spring to said bracket, and means rigidly connecting said lower end of said spring to a landing ski.

2. Means for mounting landing skis on the axle for an aircraft landing wheel after removal of said wheel, comprising a substantially C-shaped spring having upper and lower ends, a journal pivotally receiving said axle, a bracket fixed to said journal and depending therefrom, said bracket including a channel member formed with a web and depending side flanges, a lug depending from said web in spaced relation to said flanges, cross members connecting said flanges in downwardly spaced parallel relation to said web, said upper end of said spring being receivable in said bracket between said cross members and said web, said upper end of said spring being formed with a recess therein receiving said lug to lock said spring to said bracket, and means rigidly connecting said lower end of said spring to a landing ski.

3. Means for mounting landing skis on the axle for an aircraft landing wheel after removal of said wheel, comprising a substantially C-shaped spring having upper and lower ends, said spring comprising a pair of leaf-providing portions, said portions being integrally connected together at said upper end and formed to provide a transverse socket therebetween, a bushing fixed in said socket and pivotally receiving said axle, and means rigidly connecting said lower end of said spring to a landing ski.

4. Means for mounting landing skis on the axle for an aircraft landing wheel after removal of said wheel, comprising a substantially C-shaped spring having upper and lower ends, said spring comprising a plurality of leaves, means rigidly connecting all of said leaves to a landing ski at said lower end of said spring, and one leaf being extended at said upper end of said spring and formed to provide a bushing pivotally receiving said axle.

5. Means for mounting a landing ski on the axle for an aircraft landing wheel after removal of said wheel, comprising a substantially C-shaped spring having upper and lower ends, means pivotally connecting said axle to said upper end of said spring, a body of resilient material carried by one end of said spring, and said material being engageable with the other end of said spring upon compression of the same to provide a shock absorber.

6. Means for mounting a landing ski on the axle for an aircraft landing wheel after removal of said wheel, comprising a compression spring having upper and lower ends, means connecting said axle to said upper end of said spring, means connecting said ski to said lower end of said spring, said spring comprising the sole support between said axle and ski, whereby said spring comprises a universal connection between said ski and axle permitting limited resilient universal movement of said ski relative to said axle.

7. Means for mounting a landing ski in the axle for an aircraft landing wheel after removal of said wheel, comprising a substantially C-shaped spring having upper and lower ends, means connecting said axle to said upper end of said spring, means connecting said ski to said lower end of said spring, said spring comprising the sole support between said axle and ski, whereby to permit limited resilient universal movement of said ski relative to said axle.

8. Means for mounting a landing ski on the axle for an aircraft landing wheel after removal of said wheel, comprising a substantially C-shaped spring having upper and lower ends, means connecting said axle to said upper end of said spring, means connecting said ski to said lower end of said spring, said upper and lower ends of said spring being forwardly directed, said spring comprising the sole support between said axle and ski, whereby to permit limited resilient universal movement of said ski relative to said axle.

9. Means for mounting a landing ski on the axle for an aircraft landing wheel after removal of said wheel, comprising a substantially C-shaped spring having upper and lower ends, means connecting said axle to said upper end of said spring, means connecting said ski to said lower end of said spring, said upper and lower ends of said spring being forwardly directed, said spring comprising the sole support between said axle and ski, whereby to permit limited resilient universal movement of said ski relative to said axle, and said lower end of said spring being substantially coextensive in width with said ski.

JESSE R. CARR.

REFERENCES CITED

The following references are of record in the file of this patent:

UNITED STATES PATENTS

| Number | Name | Date |
| --- | --- | --- |
| 1,701,212 | Nickerson | Feb. 5, 1929 |
| 1,752,416 | Cheesman | Apr. 1, 1930 |

FOREIGN PATENTS

| Number | Country | Date |
| --- | --- | --- |
| 407,712 | France | Jan. 6, 1910 |
| 417,325 | France | Aug. 27, 1910 |